US 11,474,068 B2

United States Patent
Namekata et al.

(10) Patent No.: US 11,474,068 B2
(45) Date of Patent: Oct. 18, 2022

(54) GAS SENSOR ELEMENT AND GAS SENSOR

(71) Applicants: DENSO CORPORATION, Kariya (JP); SOKEN, INC., Kariya (JP)

(72) Inventors: Chika Namekata, Kariya (JP); Yasufumi Suzuki, Kariya (JP); Makoto Ito, Kariya (JP); Masatoshi Ikeda, Kariya (JP); Shota Hagino, Kariya (JP)

(73) Assignees: DENSO CORPORATION, Kariya (JP); SOKEN, INC., Nisshin (JP)

( * ) Notice: Subject to any disclaimer, the term of this patent is extended or adjusted under 35 U.S.C. 154(b) by 393 days.

(21) Appl. No.: 16/735,915

(22) Filed: Jan. 7, 2020

(65) Prior Publication Data

US 2020/0141896 A1 May 7, 2020

Related U.S. Application Data

(63) Continuation of application No. PCT/JP2018/024922, filed on Jun. 29, 2018.

(30) Foreign Application Priority Data

Jul. 7, 2017 (JP) .............................. JP2017-133907

(51) Int. Cl.
*G01N 27/407* (2006.01)
*G01N 27/41* (2006.01)
*G01N 27/406* (2006.01)

(52) U.S. Cl.
CPC ..... *G01N 27/4071* (2013.01); *G01N 27/4075* (2013.01); *G01N 27/41* (2013.01); *G01N 27/4067* (2013.01)

(58) Field of Classification Search
CPC .. G01N 27/41; G01N 27/4071; G01N 27/406; G01N 27/407; G01N 27/4076; G01N 27/4075; G01N 27/4067
See application file for complete search history.

(56) References Cited

U.S. PATENT DOCUMENTS

| 2014/0311906 A1 | 10/2014 | Oya et al. |
| 2015/0241384 A1 | 8/2015 | Okamoto et al. |
| 2015/0293051 A1 | 10/2015 | Kajiyama et al. |
| 2015/0353742 A1 | 12/2015 | Okamoto et al. |
| 2018/0313781 A1 | 11/2018 | Segawa et al. |

FOREIGN PATENT DOCUMENTS

JP 2014-145607 8/2014

*Primary Examiner* — Benjamin R Schmitt
(74) *Attorney, Agent, or Firm* — Nixon & Vanderhye P.C.

(57) ABSTRACT

A gas sensor element includes a solid electrolyte having oxygen-ion conductivity, a first electrode film located on one side of the solid electrolyte, a second electrode film located on the other side of the solid electrolyte. At least one of the first electrode film and the second electrode film includes noble metal particles, solid electrolyte particles having oxygen-ion conductivity, and pores, and a capacitance in the electrode film is 80 μF or less. A gas sensor includes the gas sensor element.

4 Claims, 7 Drawing Sheets

GAS SENSOR ELEMENT AND GAS SENSOR

CROSS-REFERENCE TO RELATED APPLICATION

This application is the continuation application of International Application No. PCT/JP2018/024922 filed Jun. 29, 2018 which designated the U.S. and claims priority to Japanese Patent Application No. 2017-133907 filed Jul. 7, 2017, the entire contents of each of which are hereby incorporated by reference.

BACKGROUND

Technical Field

The present disclosure relates to a gas sensor element and a gas sensor.

Related Art

Conventionally, for example, gas sensors that include a gas sensor element including a solid electrolyte having oxygen-ion conductivity, a measurement electrode film, which is located on one side of the solid electrolyte and is exposed to a measurement gas, and a reference electrode film, which is located on the other side of the solid electrolyte and is exposed to a reference gas, are well-known as a gas sensor located in an exhaust pipe of an internal combustion engine. The electrode films of the gas sensor element generally include noble metal particles such as Pt, solid electrolyte particles having oxygen-ion conductivity, and pores.

SUMMARY

As an aspect of the present disclosure, a gas sensor element is provided which includes a solid electrolyte having oxygen-ion conductivity, a first electrode film located on one side of the solid electrolyte, and a second electrode film located on the other side of the solid electrolyte. At least one of the first electrode film and the second electrode film includes noble metal particles, solid electrolyte particles having oxygen-ion conductivity, and pores, and a capacitance in the electrode film is 80 µF or less.

DETAILED DESCRIPTION OF THE PREFERRED EMBODIMENTS

Conventionally, for example, gas sensors that include a gas sensor element including a solid electrolyte having oxygen-ion conductivity, a measurement electrode film, which is located on one side of the solid electrolyte and is exposed to a measurement gas, and a reference electrode film, which is located on the other side of the solid electrolyte and is exposed to a reference gas, are well-known as a gas sensor located in an exhaust pipe of an internal combustion engine. The electrode films of the gas sensor element generally include noble metal particles such as Pt, solid electrolyte particles having oxygen-ion conductivity, and pores.

To improve the response of the gas sensor, Japanese Laid-Open Patent Publication No. 2017-72581 discloses a technique that sets the grain boundary capacitance between crystal grains of the solid electrolyte in the gas sensor element to be 150 µF or less.

However, Japanese Laid-Open Patent Publication No. 2017-72581 does not improve the electrode films to enhance the response of the gas sensor when the gas is changed. Thus, there is still room for improvement in enhancing the response of the gas sensor.

It is an object of the present disclosure to provide a gas sensor element that improves the response of a gas sensor when the gas is changed and to provide a gas sensor.

First Embodiment

Figure 1:
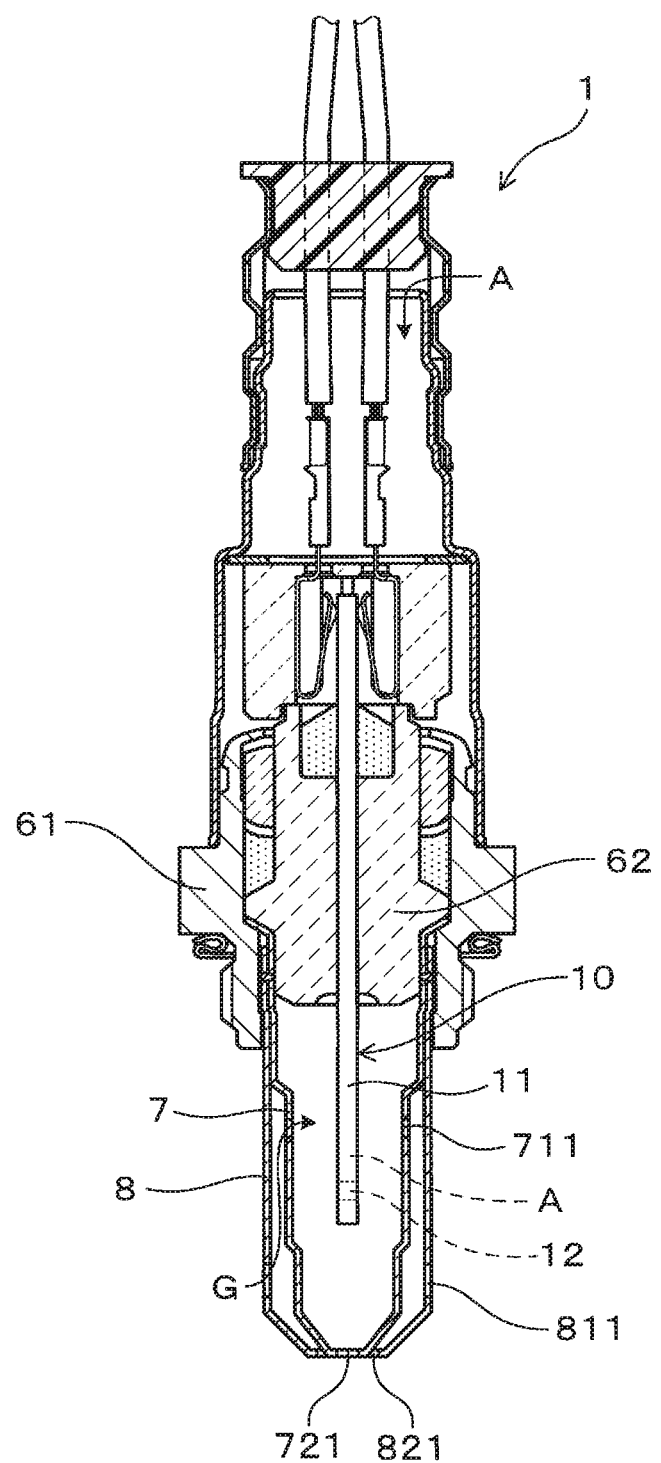
FIG. 1 is a cross-sectional view of a gas sensor according to a first embodiment that includes a gas sensor element according to the first embodiment.
Figure 2:
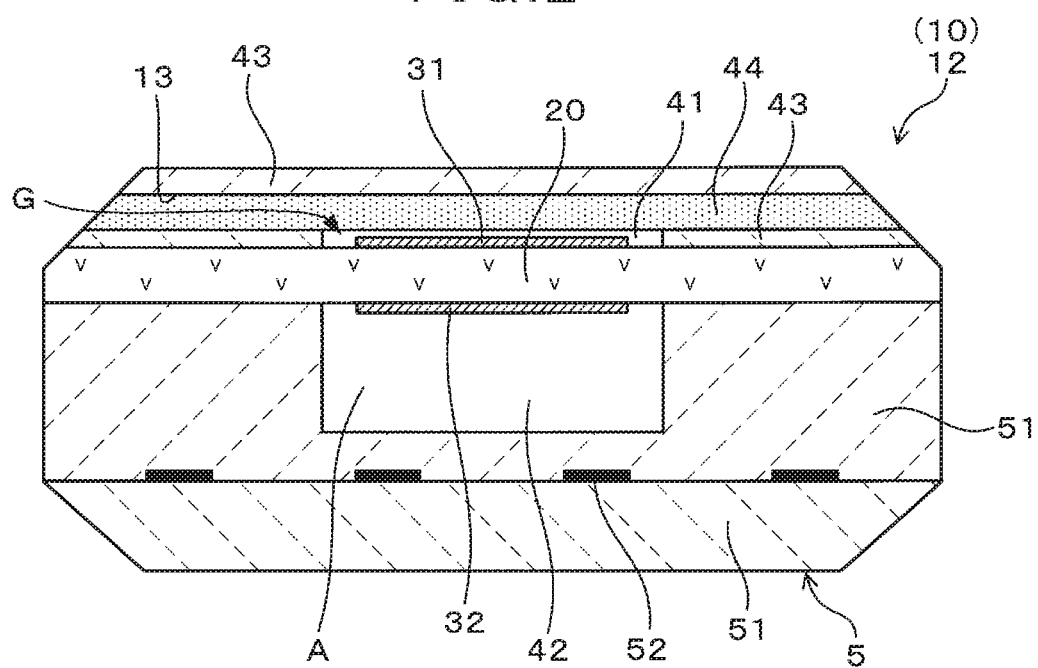
FIG. 2 is a cross-sectional view of the gas sensor element according to the first embodiment of the gas sensor according to the first embodiment in a direction orthogonal to a longitudinal direction.
Figure 3:
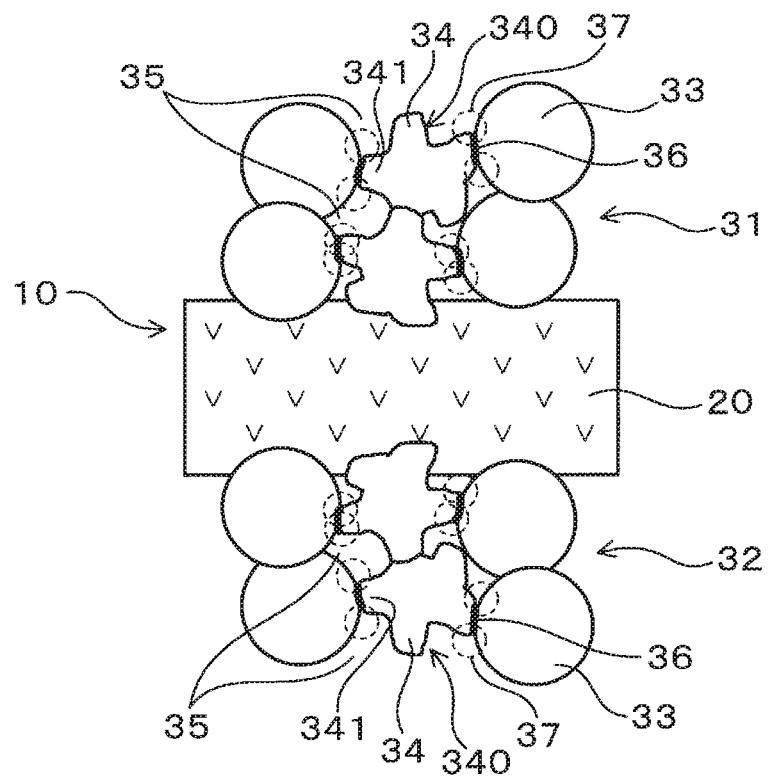
FIG. 3 is an explanatory diagram schematically illustrating a microstructure of a first electrode film and a second electrode film of the gas sensor element according to the first embodiment.

A gas sensor element and a gas sensor according to a first embodiment will be described with reference to FIGS. 1 to 7. As illustrated in FIG. 3, a gas sensor element 10 of the present embodiment includes a solid electrolyte 20 having oxygen-ion conductivity, a first electrode film 31 located on one side of the solid electrolyte 20, and a second electrode film 32 located on the other side of the solid electrolyte 20. At least one of the first electrode film 31 and the second electrode film 32 includes noble metal particles 33, solid electrolyte particles 34 having oxygen-ion conductivity, and pores 35. The capacitance in the electrode film is 80 µF or less. Additionally, as illustrated in FIGS. 1 and 2, a gas sensor 1 of the present embodiment includes the gas sensor element 10 of the present embodiment. A detailed description will follow.

As shown in FIGS. 1 and 2, the gas sensor 1 is an exhaust system sensor that measures, for example, the concentration of oxygen and the concentration of a specific gas component in a measurement gas G. The measurement gas G is the exhaust gas discharged from an internal combustion engine. The air is referred to as a reference gas A. In the present embodiment, more specifically, the gas sensor 1 is an A/F sensor, which is located in an exhaust pipe of an engine, which is the internal combustion engine. The exhaust gas that passes through the exhaust pipe is referred to as the measurement gas G, and the air is referred to as the reference gas A. The gas sensor 1 obtains the concentration of oxygen in the measurement gas G to calculate the A/F (air-fuel ratio) of the engine based on the oxygen concentration. Even more specifically, the gas sensor 1 may be an A/F sensor that quantitatively calculates the air-fuel ratio of the engine by using the limiting current characteristics based on the diffusion control of the measurement gas G. Alternatively, the gas sensor 1 may be a concentration cell sensor that detects whether an air-fuel ratio, which is the mixture ratio of fuel and air in the engine, is in a rich condition where there is excessive fuel or in a lean condition where there is excessive air with respect to a stoichiometric air-fuel ratio. Alternatively, the gas sensor 1 may be configured as a gas sensor other than the A/F sensor. That is, as long as the gas sensor includes the gas sensor element including the electrode film containing the noble metal particles, the solid electrolyte particles having the oxygen-ion conductivity, and the pores, the gas sensor element 10 of the present embodiment can be applied.

In the present embodiment, more specifically, the gas sensor 1 includes the gas sensor element 10, an insulator 62, which retains the gas sensor element 10, a housing 61, which retains the insulator 62, and an inside cover 7 and an outside cover 8, which are retained by the housing 61. The gas sensor element 10 includes a projection 11, which projects from the insulator 62. The inside cover 7 and the outside cover 8 cover the projection 11 of the gas sensor element 10. The projection 11 is provided with a gas measuring section 12, which takes in the measurement gas G and measures the oxygen concentration of the measurement gas G. The inside cover 7 includes inside passage holes 711 and 721 through which the measurement gas G passes, and the outside cover 8 includes outside passage holes 811 and 821 through which the measurement gas G passes. Instead of using double protection covers including the inside cover 7 and the outside cover 8, a single protection cover may be used. The locations of the inside passage holes 711 and 721 and the outside passage holes 811 and 821 are not limited to particular places.

As shown in FIG. 2, the gas measuring section 12 includes an introduction section 13, through which the measurement gas G is introduced, the first electrode film 31, which is located on one side of the solid electrolyte 20, is exposed to the measurement gas G, and is a measurement electrode film in this embodiment, the second electrode film 32, which is located on the other side of the solid electrolyte 20, is exposed to the reference gas A, and is a reference electrode film in this embodiment, and part of the solid electrolyte 20, which is sandwiched between the measurement electrode film 31 and the reference electrode film 32. A heater 5 is stacked on the solid electrolyte 20 of the gas sensor element 10 to heat and activate the solid electrolyte 20, the measurement electrode film 31, and the reference electrode film 32.

A measurement gas chamber 41, in which the measurement gas G is introduced, is formed on one side of the solid electrolyte 20. The measurement electrode 31 is located in the measurement gas chamber 41. The measurement gas chamber 41 is defined by an insulation body 43 and a diffusion resistance layer 44, through which the measurement gas G passes at a predetermined diffusion velocity. A reference gas chamber 42, in which the reference gas A is introduced, is formed on the other side of the solid electrolyte 20. The reference electrode film 32 is located in the reference gas chamber 42. The heater 5, which is stacked on the solid electrolyte 20, includes heating elements 52, which produces heat by the application of power, and ceramic substrates 51, which embed the heating elements 52. The reference gas chamber 42 is defined by the ceramic substrates 51. The solid electrolyte 20 is a plate configured by a solid electrolyte such as a stabilized zirconia electrolyte and a partially stabilized zirconia electrolyte containing rare-earth metal elements or alkaline-earth metal elements. In the present embodiment, more specifically, the solid electrolyte 20 is formed of yttria partially stabilized zirconia.

As illustrated in FIG. 3, at least one of the first electrode film 31, which is the measurement electrode film in this embodiment, and the second electrode film 32, which is the reference electrode film in this embodiment, includes the noble metal particles 33, the solid electrolyte particles 34, and the pores 35. The capacitance in the electrode films is 80 µF or less. The present embodiment exemplifies a case in which both the first electrode film 31 and the second electrode film 32 include the noble metal particles 33, the solid electrolyte particles 34, and the pores 35, and the capacitance in the electrode films is 80 µF or less.

The noble metal forming the noble metal particles 33 may be Pt, Pd, Rh, Ir, Ru, Os, Au, Ag, and an alloy of any of those metals. The solid electrolyte forming the solid electrolyte particles 34 may be the above-mentioned solid electrolyte. In the present embodiment, more specifically, the noble metal particles 33 are Pt particles, and the solid electrolyte particles 34 are yttria-stabilized zirconia particles.

As illustrated in FIG. 3, the contact portion where the surface of each noble metal particle 33 contacts the surface of the associated solid electrolyte particle 34 is referred to as a two-phase interface 36 (indicated by bold lines in FIG. 3) between the noble metal particle 33 and the solid electrolyte particle 34. The intersection point of the surface of each noble metal particle 33, the surface of the associated solid electrolyte particle 34, and the associated pore 35 (the gas in the pore 35) is referred to as a three-phase point 37 (the sections surrounded by circles in FIG. 3) formed by the noble metal particle 33, the solid electrolyte particle 34, and the pore 35 (the gas in the pore 35).

Since the capacitance in the electrode film is 80 µF or less, the gas sensor element 10 improves the response of the gas sensor 1 when gas is changed. This is probably because of the following reason.

Figure 4:
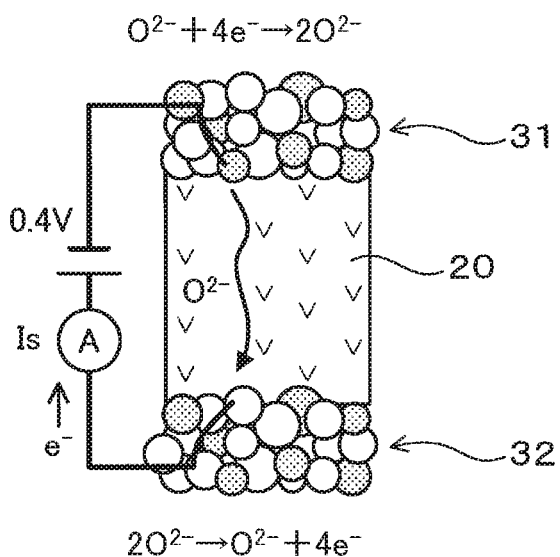
FIG. 4 is an explanatory diagram schematically illustrating a gas reaction model of the gas sensor element according to the first embodiment.
Figure 5:
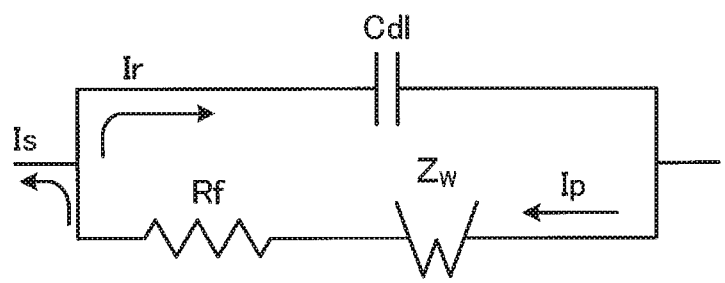
FIG. 5 is an explanatory diagram illustrating an equivalent circuit model when gas is changed according to the gas reaction model in FIG. 4.

As shown in FIG. 4, consider a gas reaction model in which a reaction of $O_2+4e^-\rightarrow 2O^{2-}$ occurs in the first electrode film 31, which is the measurement electrode film in this embodiment, the generated $O^{2-}$ moves to the second electrode film 32, which is the reference electrode film in this embodiment, through the solid electrolyte 20, and a reaction of $2O^{2-}\rightarrow O_2+4e^-$ occurs in the second electrode film 32, so that a sensor output current Is flows. When the gas reaction model is represented by the equivalent circuit, the equivalent circuit model as shown in FIG. 5 is obtained. In the equivalent circuit model of FIG. 5, Cdl denotes the capacitance, which is the capacitor component of the electrode reaction, Rf denotes the interface resistance in the electrode film, Zw denotes the gas diffusion resistance, Ip denotes the oxygen pumping current, Is represents the sensor output current, and Ir denotes the reverse current. According to the equivalent circuit model in FIG. 5, since the gas diffusion resistance Zw fluctuates when gas is changed, the reverse current Ir flows to the capacitance Cdl, which is the capacitor component of the electrode reaction. The reverse current Ir causes charging/discharging of the capacitor component. The longer the time taken for the charging/discharging of the capacitor component, the worse becomes the response of the gas sensor 1 when gas is changed. However, as described above, if the capacitance in the electrode film is in the above-described specific range, the charging/discharging of the capacitor component when gas is changed is performed in a short time. As a result, it is presumed that the response of the gas sensor 1 when gas is changed is improved.

In view of reliably improving the response of the gas sensor 1 when gas is changed, the capacitance in the electrode film is preferably 78 µF or less, more preferably 75 µF or less, even more preferably 73 µF or less, and even more preferably 70 µF or less. In view of improving the response of the gas sensor 1 when gas is changed, the smaller the capacitance in the electrode film the better, but it is difficult to make the capacitance zero for reasons of manufacturing. Thus, the lower limit of the capacitance in the electrode film is not limited to a particular value.

In the gas sensor element 10, at least one of the first electrode film 31 and the second electrode film 32 may be configured so that the interface resistance in the electrode film is 95Ω or less. With this configuration, the activation time of the gas sensor 1 is improved by decreasing the interface resistance in the electrode film. That is, with this configuration, the improvement in the response of the gas sensor 1 when gas is changed is compatible with the improvement in the activation time of the gas sensor 1.

In view of reliably improving the activation time of the gas sensor 1, the interface resistance in the electrode film is preferably 90Ω or less, more preferably 85Ω or less, even more preferably 80Ω or less, and even more preferably 7Ω or less. In view of improving the activation time of the gas sensor 1, the smaller the interface resistance in the electrode film the better, but it is difficult to make the interface resistance zero for reasons of manufacturing. Thus, the lower limit of the interface resistance in the electrode film is not limited to a particular value.

Figure 6:
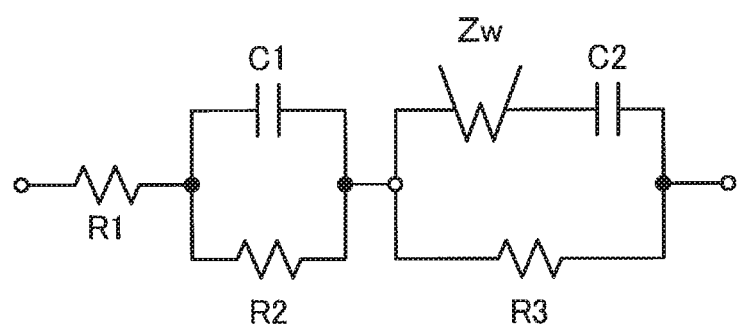
FIG. 6 is an explanatory diagram illustrating an equivalent circuit model of the gas sensor element according to the first embodiment.
Figure 7:
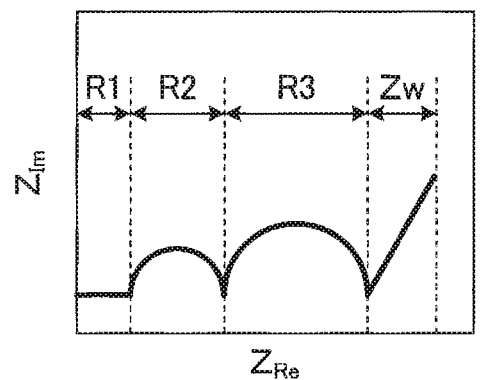
FIG. 7 is an explanatory diagram schematically illustrating a Cole-Cole plot when obtaining the capacitance and the interface resistance in the electrode film.

The capacitance and the interface resistance in the electrode film are measured by conducting an impedance analysis of the electrode film. The measurements are made in the sensor operating temperature range of 600 to 800° C. More specifically, the impedance analysis is conducted in the following manner. FIG. 6 shows the equivalent circuit model of the gas sensor element 10. FIG. 7 shows a schematic diagram of a Cole-Cole plot. In FIGS. 6 and 7, R1 denotes the intraparticle resistance of the solid electrolyte particles 34. R2 denotes the grain boundary resistance of the solid electrolyte particles 34. R3 denotes the interface resistance in the electrode film. C1 denotes the grain boundary capacitance between the electrode film and the solid electrolyte 20. C2 denotes the capacitance in the electrode film. Zw denotes the gas diffusion resistance. ZRe denotes the real component of the impedance. ZIm denotes the imaginary component of the impedance. As shown in FIGS. 6 and 7, the capacitance C2 and the interface resistance R3 in the electrode film are obtained by performing equivalent circuit fitting of the obtained Cole-Cole plot.

More specifically, as shown in FIG. 3, the solid electrolyte particles 34 may be configured to include uneven surfaces 340. With this configuration, the peripheral length of each solid electrolyte particle 34 is increased, and the solid electrolyte particles 34 are brought into contact with the noble metal particles 33 at projections 341 of the uneven surfaces 340 of the solid electrolyte particles 34. Thus, with this configuration, the two-phase interface amount between the noble metal particles 33 and the solid electrolyte particles 34 is likely to be reduced, so that the capacitance built up in the two-phase interface amount is likely to be reduced. Consequently, since the configuration is capable of reducing the two-phase interface amount, the capacitance in the electrode film is easily set within the above-described specific range.

Additionally, according to the above configuration, due to the reduction in the two-phase interface amount, the number of the three-phase points 37 formed by the noble metal particles 33, the solid electrolyte particles 34, and the pores 35 is increased. Thus, according to the above configuration, the activation time of the gas sensor 1 is improved. That is, according to the above configuration, the compatibility between the improvement of the response of the gas sensor 1 when gas is changed and the improvement of the activation time of the gas sensor 1 is reliably achieved.

The solid electrolyte particles 34 having the uneven surfaces 340 are formed of, for example, a sintered body of the solid electrolyte particles 34 having a particle size smaller than the particle size of the noble metal particles 33. With this configuration, for example, a mixture containing the noble metal particles 33 having a predetermined particle size and the solid electrolyte particles 34 having a particle size smaller than the particle size of the noble metal particles 33 is applied to the surface of the solid electrolyte 20. The solid electrolyte 20 is then baked, so that the solid electrolyte particles 34, which are fine particles, agglomerate and sinter. This forms the solid electrolyte particles 34 having the uneven surfaces 340. Thus, according to the above configuration, the gas sensor element 10 that improves the response of the gas sensor 1 when gas is changed is relatively easily obtained.

Second Embodiment

A gas sensor element and a gas sensor according to a second embodiment will be described. The reference numerals used in and after the second embodiment that are the same as the reference numerals in the previously described embodiment refer to the same components as those in the previously described embodiment unless otherwise specified.

In the gas sensor element 10 of the present embodiment, the value of Lre/Le of at least one of the first electrode film 31 and the second electrode film 32 is 0.50 or more and 1.25 or less on the electrode film cross-section in the film thickness direction. Note that, Lre denotes the total length of the two-phase interfaces 36 between the noble metal particles 33 and the solid electrolyte particles 34 per the electrode film cross-section. Le denotes the total peripheral length of the solid electrolyte particles 34 per the electrode film cross-section.

With this configuration, the capacitance in the electrode film is easily set within the above-described specific range. This is because the two-phase interface length between the noble metal particles 33 and the solid electrolyte particles 34 is sufficiently small. If the value of Lre/Le becomes less than the lower limit value, the contact portions between the noble metal particles 33 and the solid electrolyte particles 34 become insufficient, so that the conductivity decreases. This is likely to increase the capacitance. If the value of Lre/Le becomes greater than the upper limit value, the two-phase interface length between the noble metal particles 33 and the solid electrolyte particles 34 becomes great. This is likely to increase the capacitance.

In view of inhibiting the increase in the capacitance in the electrode film, the Lre/Le value is preferably 0.52 or more, more preferably 0.55 or more, even more preferably 0.57 or more, and even more preferably 0.60 or more. In view of inhibiting the increase in the capacitance in the electrode film, the Lre/Le value is preferably 1.24 or less, more preferably 1.23 or less, even more preferably 1.22 or less, and even more preferably 1.20 or less. The present embodiment is an example in which the values of Lre/Le of both the first electrode film 31, which is the measurement electrode film in this embodiment, and the second electrode film 32, which is the reference electrode film in this embodiment, are in the above-described specific range.

In the gas sensor element 10 of the present embodiment, the value of P/Le of at least one of the first electrode film 31 and the second electrode film 32 is preferably 0.20 or more and 0.78 or less on the electrode film cross-section in the film thickness direction. Note that, P denotes the number of the three-phase points 37, which are formed by the noble metal particles 33, the solid electrolyte particles 34, and the pores 35, per the electrode film cross-section. As described above, Le denotes the total peripheral length of the solid electrolyte particles 34 per the electrode film cross-section.

With this configuration, the interface resistance in the electrode film is easily set to the above-described specific range. This is because there is a sufficient amount of the three-phase points 37. If the value of P/Le becomes less than the lower limit value, the three-phase points 37 tend to be insufficient, and the interface resistance in the electrode film is likely to increase. If the value of P/Le becomes greater than the above upper limit value, the contact portions between the noble metal particles 33 and the solid electrolyte particles 34 become insufficient, so that the conductivity decreases. This is likely to increase the interface resistance.

In view of inhibiting the increase in the interface resistance in the electrode film, the P/Le value is preferably 0.22 or more, more preferably 0.25 or more, even more preferably 0.27 or more, and even more preferably 0.30 or more. Additionally, in view of inhibiting the increase in the interface resistance in the electrode film, the P/Le value is preferably 0.77 or less, more preferably 0.75 or less, and even more preferably 0.73 or less. The present embodiment is an example in which the P/Le values of both the first electrode film 31, which is the measurement electrode film in this embodiment, and the second electrode film 32, which is the reference electrode film in this embodiment, are in the above-described specific range.

The total length Lre of the two-phase interfaces 36, the total peripheral length Le of the solid electrolyte particles 34, and the number P of the three-phase points 37, which are described above, are basically calculated by taking a SEM image (magnification of 5000 times) of the electrode film cross-section in the film thickness direction and conducting an image analysis. More specifically, Lre, Le, and P are calculated as below.

First, a backscattered electron image (magnification of 5000 times) of the electrode film cross-section in the film thickness direction is obtained by a scanning electron microscope (SEM). Subsequently, the obtained backscattered electron image is divided into regions including noble metal particle regions, solid electrolyte particle regions, and pore regions based on the brightness. At this time, in view of accurately obtaining Lre, Le, and P in the electrode film, the regions from the interfaces between the solid electrolyte 20 and the electrode films 31 and 32 to 2 μm inside the electrode films 31 and 32 and the regions from the outer surfaces of the electrode films 31 and 32 to 2 μm inside the electrode films 31 and 32 are excluded. The sampling region excluding these regions is divided into the regions including the noble metal particle region, the solid electrolyte particle region, and the pore region. The sampling region may be approximately 30 μm×5 μm. Subsequently, the contours of the separated noble metal particle region, solid electrolyte particle region, and pore region are obtained. The total peripheral length Le (μm/μm2) of the solid electrolyte particles 34 per unit cross-sectional area is obtained from the obtained contour of the solid electrolyte particle region. Subsequently, from the common line (contact line) of the contour of the noble metal particle region and the contour of the solid electrolyte particle region, the total length Lre (μm/μm2) of the two-phase interfaces 36 between the noble metal particles 33 and the solid electrolyte particles 34 per unit cross-sectional area is obtained. Subsequently, from the common points (contact points) among the contour of the noble metal particle region, the contour of the solid electrolyte particle region, and the contour of the pore region, the number P (–/μm2) of the three-phase points 37 formed by the noble metal particles 33, the solid electrolyte particles 34, and the pores 35 is obtained. Subsequently, the obtained Lre value is divided by the Le value to obtain Lre/Le (–). The obtained P value is divided by the Le value to obtain P/Le (/μm).

Other structures and the operational advantages are the same as those of the first embodiment.

EXPERIMENTAL EXAMPLE 1

Multiple gas sensors including gas sensor elements each having a different capacitance in the electrode film were prepared, and the imbalance response when each gas sensor measures the oxygen concentration in the measurement gas was obtained. In the present experimental example, the primary particle size of the Pt particles as raw materials used for forming the electrode film was 0.6 μm, and the primary particle size of the solid electrolyte particles as raw materials was in the range of 0.2 μm to 0.6 μm. The above-described primary particle size is the particle size (diameter) d50 (hereinafter, omitted) when the volume-based cumulative frequency distribution measured by a laser diffraction and scattering method indicates 50%.

Figure 8:
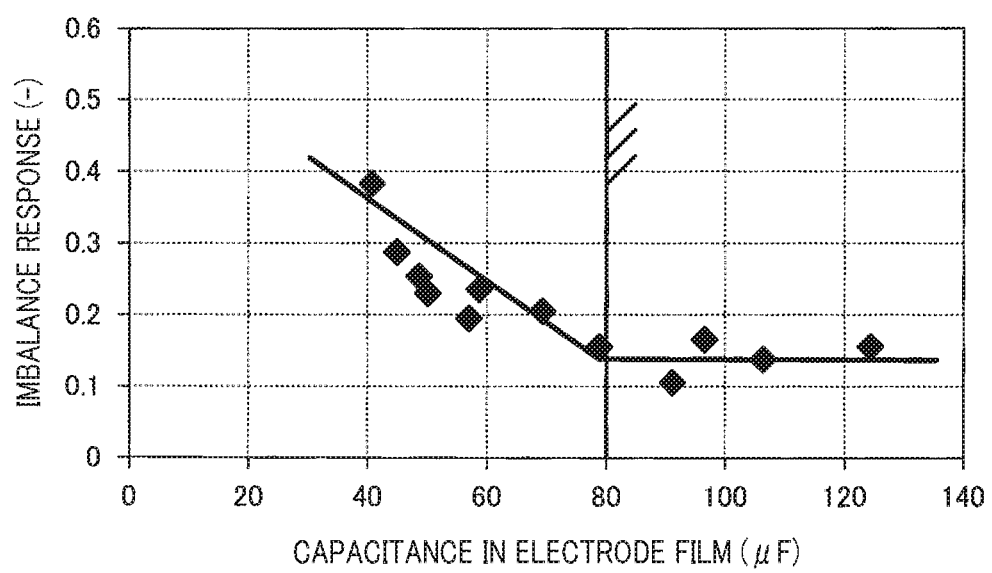
FIG. 8 is a graph showing the relationship between the capacitance (µF) in the electrode film and the imbalance response (−) according to experimental example 1.

FIG. 8 shows the relationship between the capacitance (μF) in the electrode film and the imbalance response (–). The imbalance response is represented by the ratio (Y/X) between the amplitude X of the theoretical air-fuel ratio (A/F) due to the change in the oxygen concentration of the measurement gas G supplied to the gas sensor and the amplitude Y of the air-fuel ratio actually output by the gas sensor. The imbalance response indicates the speed of the response for obtaining the imbalance, which is the difference in the air-fuel ratio caused between the cylinders of the engine. The imbalance response is an index that shows that the response is improved as the value increases to approach one.

As shown in FIG. 8, if the capacitance in the electrode film is 80 µF or less, the imbalance response is rapidly improved compared with a case in which the capacitance in the electrode film exceeds 80 µF. From the result, it is confirmed that the response of the gas sensor when gas is changed is improved by setting the capacitance in the electrode film to be 80 µF or less. In the present experimental example, the capacitance in the electrode film became 80 µF or less by setting the primary particle size of the solid electrolyte particles as raw materials used for forming the electrode film to be within the range of 0.25 µm to 0.4 µm, the baking temperature to 1450° C., and the baking time to 1 hour. Additionally, in the present experimental example, the samples with the capacitance in the electrode film of 80 µF or less had the interface resistance in the electrode film of 95Ω or less.

(Experiment 2)

Figure 9:
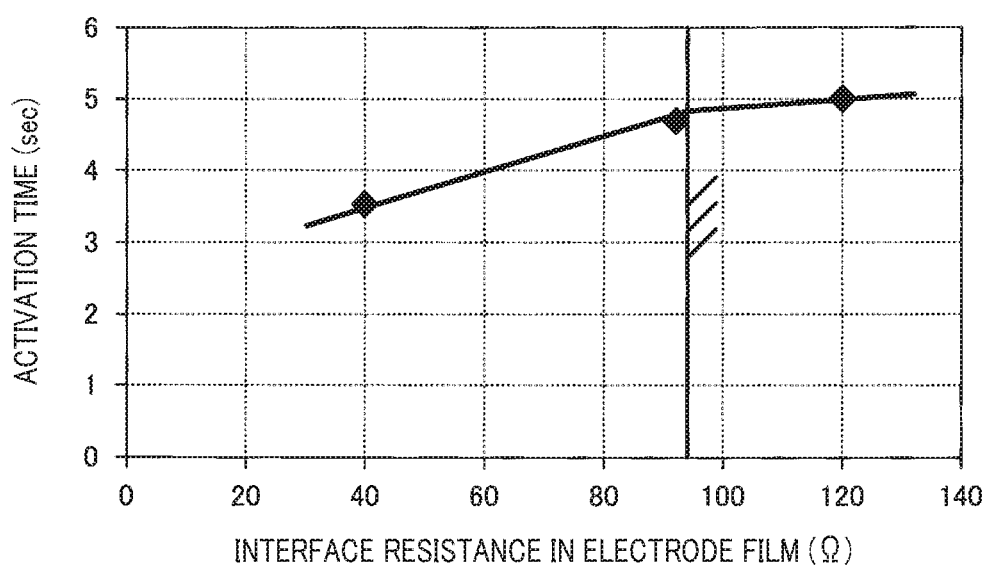
FIG. 9 is a graph showing the relationship between the interface resistance (Ω) in the electrode film and the activation time (sec) according to experimental example 2.

Multiple gas sensors including gas sensor elements each having different interface resistance in the electrode film were prepared, and the activation time when each gas sensor measures the oxygen concentration in the measurement gas G was obtained. In the present experimental example, the primary particle size of the Pt particles as raw materials used for forming the electrode film was 0.6 µm, and the primary particle size of the solid electrolyte particles as raw materials was in the range of 0.3 µm to 0.6 µm. FIG. 9 shows the relationship between the interface resistance (Ω) in the electrode film and the activation time (sec).

As shown in FIG. 9, if the interface resistance in the electrode film is 95Ω or less, the activation time is significantly decreased compared with a case in which the interface resistance in the electrode film exceeds 95Ω. From the result, it is confirmed that the activation time of the gas sensor is improved by setting the interface resistance in the electrode film to be 95Ω or less.

(Experiment 3)

Multiple gas sensor elements having different Lre/Le values on the electrode film cross-section in the film thickness direction were prepared, and the relationship between Lre/Le (–) and the capacitance (µF) in the electrode film and the relationship between P/Le (/µm) and the interface resistance (Ω) in the electrode film were obtained.

Figure 10:
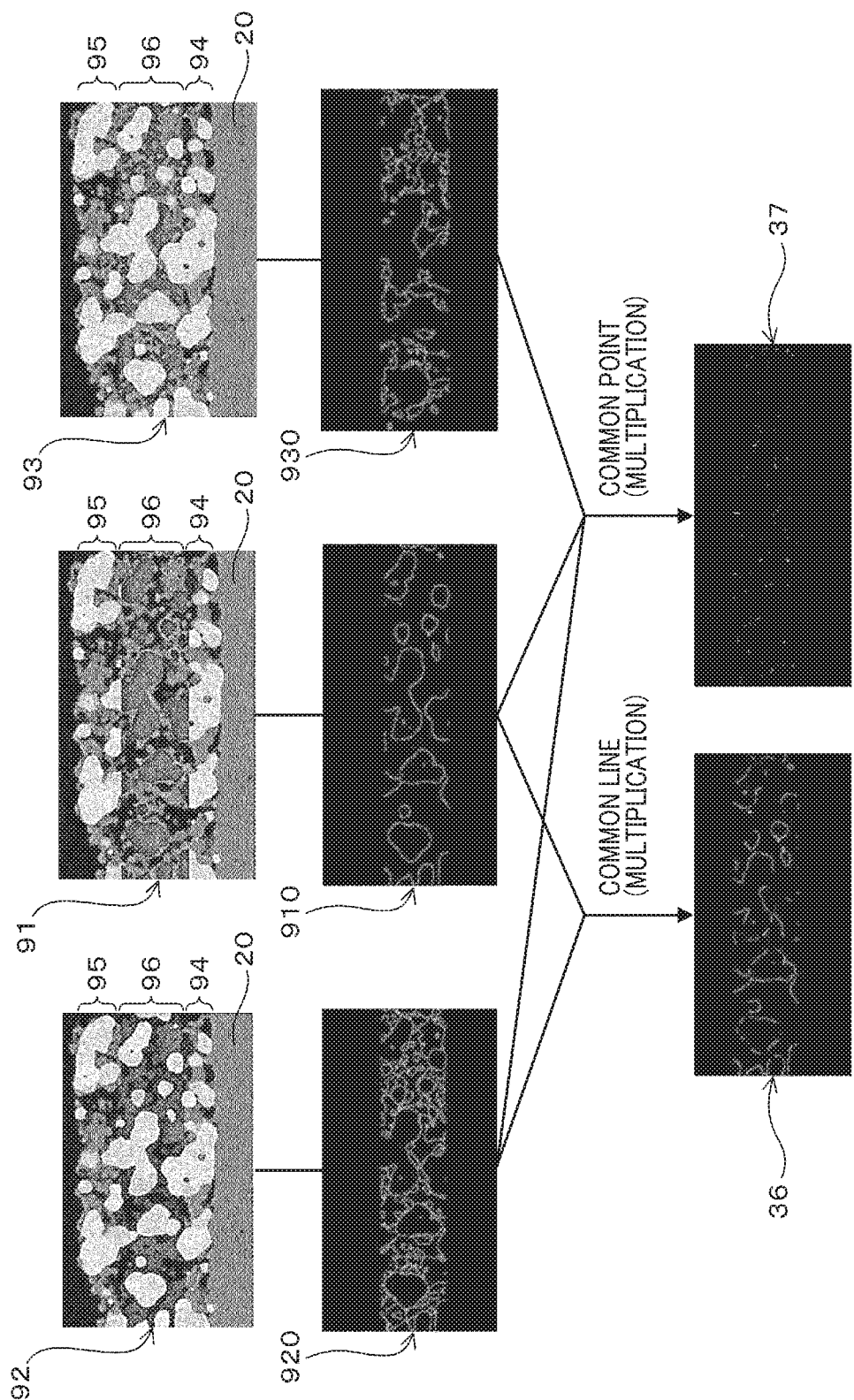
FIG. 10 is an explanatory diagram illustrating a method for calculating an Lre/Le value and a P/Le value (/µm) according to experimental example 3.

Lre/Le (–) and P/Le (µm) were obtained in the following manner. First, the backscattered electron image (magnification of 5000 times) of the electrode film cross-section in the film thickness direction was obtained by the scanning electron microscope (SEM). Subsequently, the obtained backscattered electron image was divided into regions including a noble metal particle region 91, a solid electrolyte particle region 92, and a pore region 93 based on the brightness as shown in FIG. 10. At this time, in view of accurately obtaining Lre, Le, and P in the electrode film, a region 94 from the interface between the solid electrolyte 20 and the electrode film to 2 µm inside the electrode film and a region 95 from the outer surface of the electrode film to 2 µm inside the electrode film were excluded. This means that a sampling region 96 excluding these regions 94 and 95 were divided into the regions including the noble metal particle region 91, the solid electrolyte particle region 92, and the pore region 93. The sampling region 96 was approximately 30 µm×5 µm. Subsequently, the contours of the separated noble metal particle region 91, the solid electrolyte particle region 92, and the pore region 93 were obtained. The total peripheral length Le (µm/µm2) of the solid electrolyte particles 34 per unit cross-sectional area was obtained from a contour 920 of the solid electrolyte particle region 92 that has been obtained. Subsequently, from a common line (contact line) between a contour 910 of the noble metal particle region 91 and the contour 920 of the solid electrolyte particle region 92, the total length Lre (µm/µm2) of the two-phase interface 36 between the noble metal particles 33 and the solid electrolyte particles 34 per unit cross-sectional area was obtained. Subsequently, from the common points (contact points) among the contour 910 of the noble metal particle region 91, the contour 920 of the solid electrolyte particle region 92, and a contour 930 of the pore region 93, the number P (–/µm2) of the three-phase points 37 formed by the noble metal particles 33, the solid electrolyte particles 34, and the pores 35 was obtained. Subsequently, the obtained Lre value was divided by the Le value to obtain Lre/Le (–). Additionally, the obtained P value was divided by the Le value to obtain P/Le (/µm).

Figure 11:
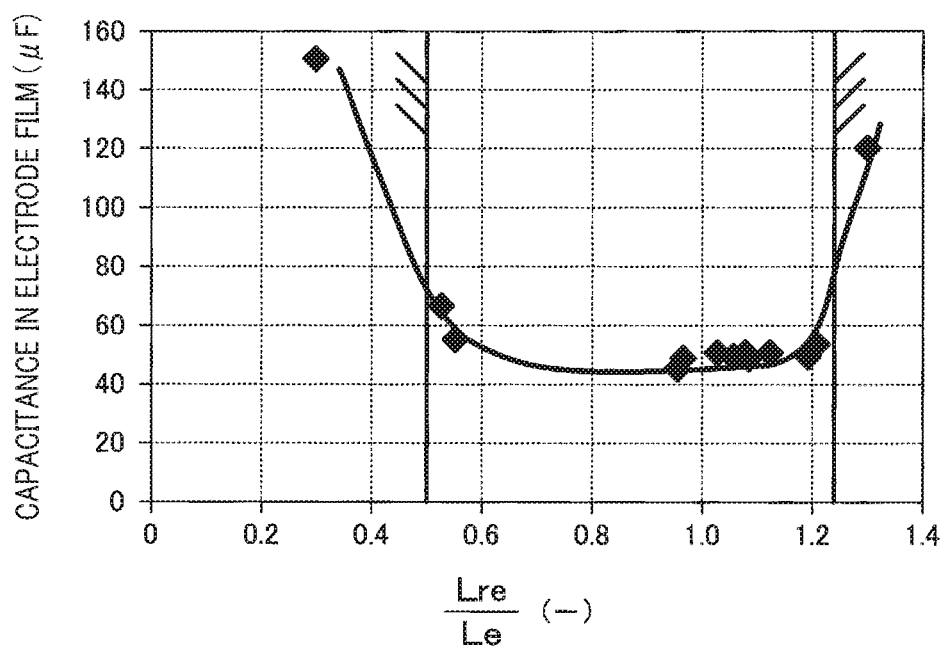
FIG. 11 is a graph showing the relationship between the Lre/Le value (−) and the capacitance (µF) in the electrode film according to experimental example 3.
Figure 12:
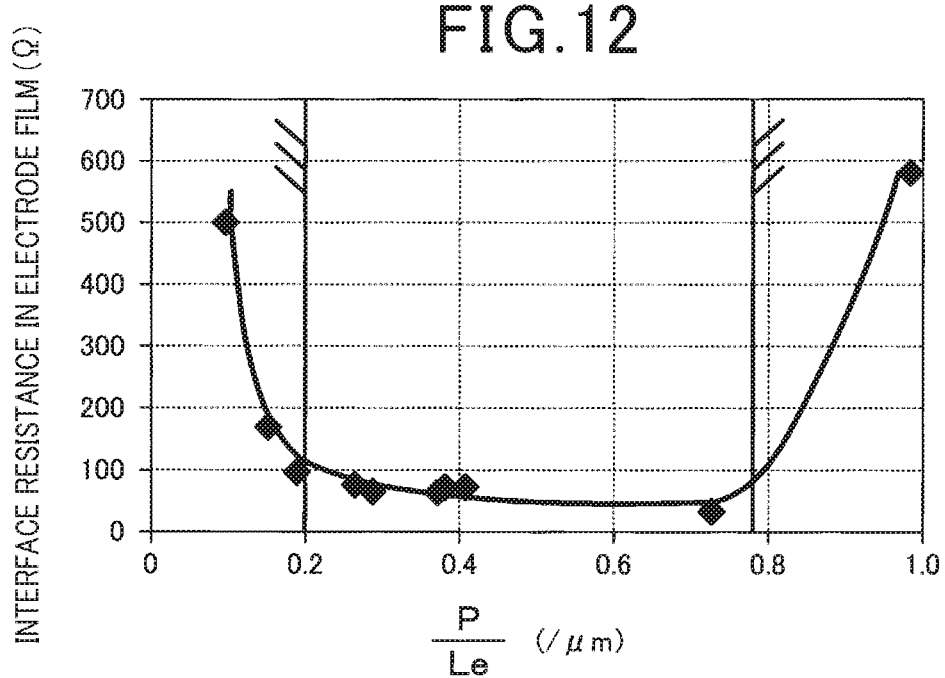
FIG. 12 is a graph showing the relationship between the P/Le value (/µm) and the interface resistance (Ω) in the electrode film according to experimental example 3.

FIG. 11 shows the relationship between Lre/Le (–) and the capacitance (µF) in the electrode film. FIG. 12 shows the relationship between P/Le (/µm) and the interface resistance (Ω) in the electrode film. As shown in FIG. 11, it was confirmed that if the Lre/Le value is 0.50 or more and 1.25 or less, the capacitance in the electrode film is easily set to be 80 µF or less. It was also confirmed that if the P/Le value is 0.20 or more and 0.78 or less, the interface resistance in the electrode film is easily set to be 95Ω or less.

In the present experimental example, the samples were formed with the primary particle size of the Pt particles as raw materials used for forming the electrode film set to 0.6 µm and the primary particle size of the solid electrolyte particles as raw materials changed to various sizes. According to the present experimental example, it was confirmed that the capacitance and the interface resistance in the electrode film are decreased to the above-mentioned range by setting the primary particle size of the solid electrolyte particles as raw materials to 0.25 µm to 0.4 µm. From the result, it was found that if the primary particle size of the solid electrolyte particles as raw materials becomes 0.4 µm or more, the two-phase interface length between the noble metal particles 33 and the solid electrolyte particles 34 is increased, so that the capacitance is increased, and the number of the three-phase points formed by the noble metal particles 33, the solid electrolyte particles 34, and the pores is decreased, so that the interface resistance is increased. If the primary particle size of the solid electrolyte particles as raw materials becomes 0.25 µm or less, it was found that although the two-phase interface length between the noble metal particles 33 and the solid electrolyte particles 34 is decreased, and the number of the three-phase points formed by the noble metal particles 33, the solid electrolyte particles 34, and the pores 35 is increased, it becomes difficult to provide conductivity, resulting in an increase in the capacitance and the interface resistance.

The present disclosure is not limited to the above embodiments and the experimental examples, and various modifications are possible without departing from the scope of the disclosure. Although the present disclosure has been described in accordance with the embodiments, it is understood that the present disclosure is not limited to the embodiments and the configurations. The present disclosure embraces various modifications and deformations that come within the range of equivalency. Additionally, various combinations and forms, or other combinations and forms including only one or more additional elements, or less than all elements are included in the scope and ideas obtainable from the present disclosure.

For example, the first embodiment exemplifies a case in which the solid electrolyte particles have uneven surfaces, and the noble metal particles are spherical. However, the noble metal particles may have uneven surfaces, and the solid electrolyte particles may be spherical. Alternatively, both the noble metal particles and the solid electrolyte particles may have uneven surfaces. The structures shown in each of the embodiments and each of the experimental examples may be combined optionally.

One aspect of the present disclosure provides a gas sensor element including a solid electrolyte having oxygen-ion conductivity, a first electrode film located on one side of the solid electrolyte, and a second electrode film located on the other side of the solid electrolyte. At least one of the first electrode film and the second electrode film includes noble metal particles, solid electrolyte particles having oxygen-ion conductivity, and pores. A capacitance in the electrode film is 80 μF or less.

Another aspect of the present disclosure provides a gas sensor including the gas sensor element.

In the gas sensor element, at least one of the first electrode film and the second electrode film includes the noble metal particles, the solid electrolyte particles having oxygen-ion conductivity, and the pores, and the capacitance in the electrode film is 80 μF or less.

Thus, the gas sensor element improves the response of the gas sensor when the gas is changed. The reason for this is presumed as below.

Consider a gas reaction model in which a reaction of $O_2+4e^-\rightarrow 2O^{2-}$ occurs in the first electrode film, the generated $O^{2-}$ moves to the second electrode through the solid electrolyte, and a reaction of $2O^{2-}\rightarrow O_2+4e^-$ occurs in the second electrode, so that a sensor output current flows. According to the equivalent circuit model of this gas reaction model, since the gas diffusion resistance fluctuates when gas is changed, a reverse current flows to the capacitance, which is the capacitor component of the electrode reaction. The reverse current causes charging/discharging of the capacitor component. The longer the time taken for the charging/discharging of the capacitor component, the worse becomes the response of the gas sensor when gas is changed. However, as described above, if the capacitance in the electrode film is in the above-described specific range, the charging/discharging of the capacitor component when gas is changed is performed in a short time. As a result, the response of the gas sensor when gas is changed is improved.

What is claimed is:

1. A gas sensor element comprising a solid electrolyte having oxygen-ion conductivity, a first electrode film located on one side of the solid electrolyte, and a second electrode film located on the other side of the solid electrolyte, wherein at least one of the first electrode film and the second electrode film includes noble metal particles, solid electrolyte particles having oxygen-ion conductivity, and pores, and a capacitance in the at least one of the first electrode film and second electrode film is 80 μf or less, wherein at least one of the first electrode film and the second electrode film includes an Lre/Le value of 0.50 or more and 1.25 or less on an electrode film cross-section in a film thickness direction, where Lre is a total length of a two-phase interface between the noble metal particles and the solid electrolyte particles per the electrode film cross-section, and Le is a total peripheral length of the solid electrolyte particles per the electrode film cross-section.

2. The gas sensor element according to claim 1, wherein at least one of the first electrode film and the second electrode film includes an interface resistance in the electrode film of 95Ω or less.

3. The gas sensor element according to claim 1, wherein at least one of the first electrode film and the second electrode film includes a P/Le value of 0.20 or more and 0.78 or less on the electrode film cross-section in the film thickness direction, where P is the number of three-phase points formed by the noble metal particles, the solid electrolyte particles, and the pores per the electrode film cross-section.

4. A gas sensor comprising the gas sensor element according to claim 1.

* * * * *